United States Patent [19]
Neff

[11] 3,787,690
[45] Jan. 22, 1974

[54] TENSION TRANSDUCER
[75] Inventor: Joseph J. Neff, Pasadena, Calif.
[73] Assignee: Bell & Howell Company, Chicago, Ill.
[22] Filed: Dec. 17, 1971
[21] Appl. No.: 209,173

[52] U.S. Cl..... 250/231 R, 250/219 FR, 242/75.52, 242/190
[51] Int. Cl.... G01d 5/34, B65h 25/22, G65h 25/10
[58] Field of Search................ 242/75.52, 189–190, 242/75.51, 154; 318/6, 7; 250/219 FR, 231 R, 231 SE

[56] References Cited
UNITED STATES PATENTS

| | | | |
|---|---|---|---|
| 3,092,764 | 6/1963 | Cooper | 242/75.52 |
| 3,405,857 | 10/1968 | Albrecht | 242/190 X |
| 3,547,369 | 12/1970 | Potucek | 242/75.52 |
| 3,643,891 | 2/1972 | Isbell | 242/189 |

FOREIGN PATENTS OR APPLICATIONS

| | | | |
|---|---|---|---|
| 22,908 | 11/1900 | Switzerland | 242/154 |
| 320,812 | 5/1957 | Switzerland | 242/75.51 |

Primary Examiner—George F. Mautz
Assistant Examiner—John M. Jillions
Attorney, Agent, or Firm—Hayden A. Carney

[57] ABSTRACT

A strip tension transducer includes a pair of strip guide rollers around which strip material, in which tension is to be measured, is passed so that the strip path is through the axis of rotation of a guide roller carrier which has its axis parallel to and midway between the axes of the guide rollers. Resilient bias means are coupled to the carrier for biasing it to rotate toward a limit of its rotation against strip tension forces applied to the guide rollers. The bias means are disposed coaxially of the carrier and are adjustable for varying the bias force applied to the carrier. An electro-optical signal generator is coupled to the carrier for generating a signal indicative of the angular position of the carrier.

1 Claim, 7 Drawing Figures

PATENTED JAN 22 1974

3,787,690

TENSION TRANSDUCER

FIELD OF THE INVENTION

This invention pertains to tension sensing transducers for moving strips, i.e., webs or filaments. More particularly, it pertains to a tension sensing transducer for use to ascertain the instantaneous tension present in magnetic recording tape at a desired location along the path of tape movement through a precision tape recorder.

BACKGROUND OF THE INVENTION

Review of the Prior Art

The basic problem to which this invention is directed is that of accurately sensing the tension of magnetic recording tape in a precision tape recorder so that tape tension adjacent the recorder heads may be controlled within predetermined tension limits.

Magnetic recording tape is relatively elastic. Variations in tape tension at the read and write heads of a tape recorder may adversely affect the ability to satisfactorily reproduce, on the same or a different recorder at the same or a different tape speed, information recorded on a given recorder. For example, if analog information at relatively high frequency is to be recorded for later playback and analysis, as may well be the case in a sophisticated engineering test, for example, it is desired that the signal frequency at playback be the same as the signal frequency at the time of recording. If the tape tension at time of playback is appreciably different from tape tension at the time of recording, the playback signal frequency will be different from the original signal frequency. Also, variations in tape tension during either recording or playback will produce apparent changes in signal frequency. These effects are produced because the tape elasticity accommodates tension changes as changes in tape length, such that more or less tape than is desired passes the read and write heads in any given unit of time.

The adverse effects of tape tension changes also are pertinent to digital information recordation, especially where digital information is recorded with high packing density.

Prior precision magnetic tape recorders incorporated various forms of tape tension sensors. In general, prior sensors were relatively large and were provided in forms peculiar to the particular tape drive mechanisms with which they were used. Thus, within the product line of a given recorder manufacturer, it was common for the tension sensors to vary from one model of recorder or transport to another. Prior tension sensor arrangements were also designed for particular tape path configurations; as tape path varied from model to model, the tension sensor arrangement varied. Further, in prior recorders, tension sensors were provided as major, essentially permanent components of the transport portion of the recorder, and such sensors could not readily be removed for repair or replacement. Also, prior tension sensors were not readily adjustable in terms of the different tension limits applicable to tape of different types or widths; if tape elongation is to be held within acceptable narrow limits, the tension force values tolerable will change as tape type and tape width changes. Additionally, the large size of prior tension sensor arrangements made it difficult to provide compact portable precision transports and recorders. Further, many prior tension sensor arrangements were less accurate than was often desired.

SUMMARY OF THE INVENTION

This invention provides an improved tape tension sensing transducer which is particularly useful as a component of a portable precision magnetic tape recorder. In its broadest sense, this invention provides an improved strip tension transducer.

The present tension transducer is compact and essentially self-contained such that it may be used as a standard modular component in a variety of tape transport configurations and tape recorder arrangements. The output signal from the present transducer varies essentially linearly with tape tension, thereby adapting the transducer for use with a variety of tape drive mechanisms and control circuits for such mechanisms; if desired, however, the transducer output signal may be arranged to vary with tape tension in any manner desired.

The present transducer is useful with many different tape path configurations. Due to its compactness, the transducer may be located at different positions along a tape path which may be arranged as desired with regard to factors other than tension sensor size, arrangement or function. Preferably, however, the tape path configuration locally of the transducer is of a particular geometry for best and most accurate operation of the transducer, but even local tape path geometry is open to design options as desired.

The modular nature of the present transducer permits ready repair or replacement should that be required. Also, the transducer is readily adjustable in terms of the tension force limits applicable to tapes of differing types and widths.

In summary, then, this invention provides a compact, modular, efficient and accurate tension transducer having particular utility in portable precision tape transports and recorders. The transducer structure is simple, and this feature enables reliability in operation and economy in manufacture.

Generally speaking, the present strip tension transducer includes guide means engageable by a moving strip, in which tension is to be measured, for the application of force to the guide means by tension in the strip. The guide means are mounted to a carrier which is rotatable about an axis in response to strip tension forces applied to the guide means. A limit of rotation of the carrier about its axis is defined by suitable means, preferably a stop means. Resilient bias means are disposed coaxially of the carrier and are coupled to the carrier for biasing the carrier about its axis toward the limit against strip tension force applied to the guide means. Electrical signal generating means are coupled to the carrier for generating a signal indicative of the angular position of the carrier, such position, in combination with the applied force characteristic of the bias means and the geometry of the strip path of movement to and from the guide means, being a measure of tension in a strip engaged by the guide means.

As used herein, the term "strip" refers to both webs (such as magnetic recording tape) and to filaments (such as wire).

DESCRIPTION OF THE DRAWINGS

The above-mentioned and other features of the invention are more fully set forth in the following detailed description of a presently preferred embodiment of the invention, which description is presented by reference to the accompanying drawings, wherein.

DESCRIPTION OF THE PREFERRED EMBODIMENTS

Figure 1:
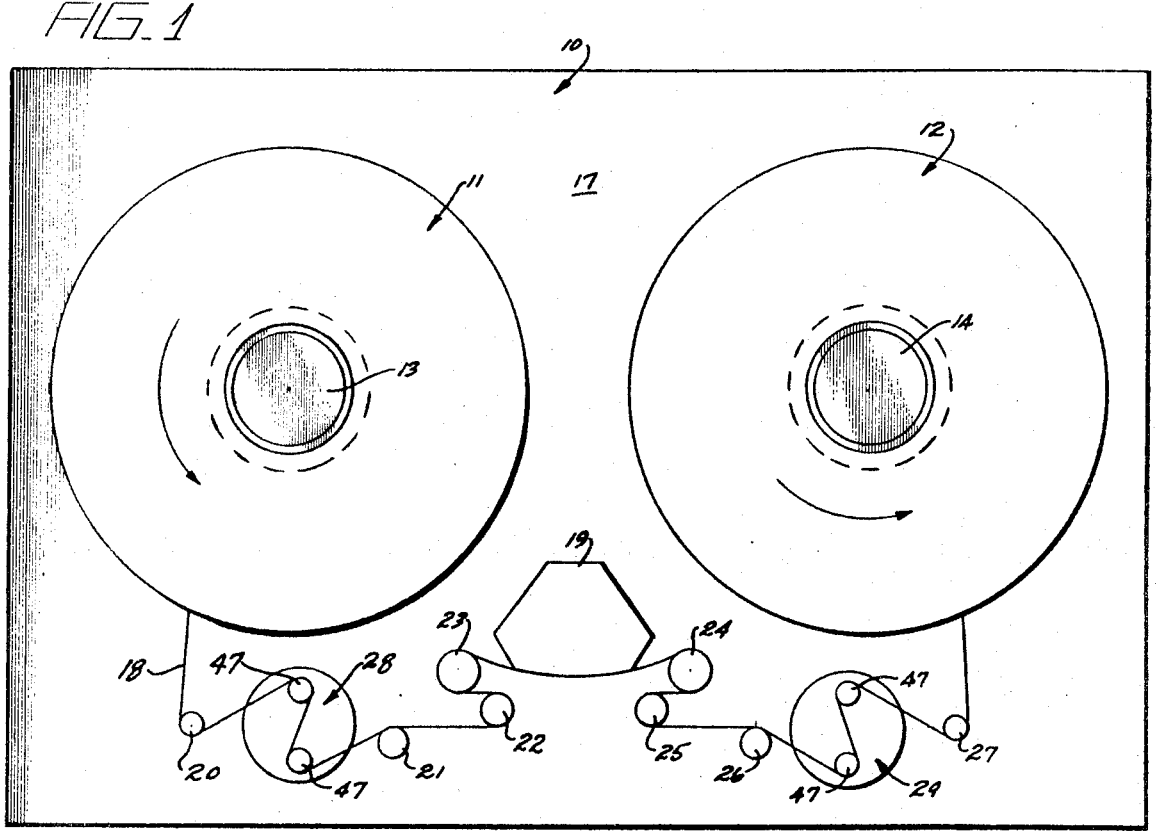
FIG. 1 is an elevation view of a tape transport assembly which incorporates two transducers according to this invention.
Figure 2:
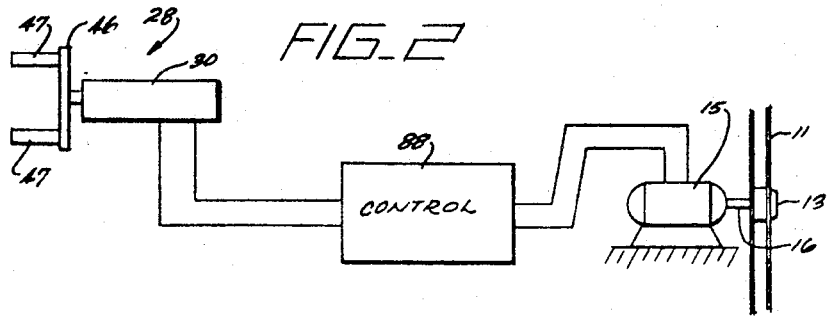
FIG. 2 is a simplified diagram showing the use of the present transducer to control a reel drive motor, as in the transport shown in FIG. 1.

As shown in FIG. 1, a tape transport 10 includes a supply reel 11 and a take-up reel 12 which are mounted by suitable hubs 13 and 14, respectively, to the drive shafts of corresponding drive motors (not shown in FIG. 1 but see motor 15 in FIG. 2 in which hub 13 is used to secure reel 11 to motor shaft 16). The tape supply and take-up reels are mounted above a transport face plate 17. A strip of magnetic recording tape 18 is threaded along a predetermined tape path from supply reel 11 to take-up reel 12. The tape path is past a head assembly 19 which preferably includes suitable record, playback and erase heads. Proceeding along the tape path from the supply reel to the take-up reel, the tape path includes idler rollers 20, 21 and 22 between the supply reel and the head assembly. Guide roller 22 is provided in association with a tape drive capstan 23 which is located adjacent to head assembly 19 on the side of the assembly toward the supply reel. A second tape drive capstan 24 is located adjacent the other side of the head assembly in association with an idler roller 25. The tape path also includes two additional idler rollers 26 and 27 proceeding along the tape path to the take-up reel. Preferably the tape path is essentially symmetrical about the head assembly, as shown in FIG. 1.

A tape tension transducer 28 is disposed in the tape path between idler rollers 20 and 21 and a second tape tension transducer 29 is disposed in the tape path between idler rollers 26 and 27. As will be apparent from the following description, each tape tension transducer functions within transport 10 to maintain tape 18 at the adjacent portion of the tape path within predetermined relatively narrow limits of tape tension, to sense the instantaneous value of tape tension, and to generate a control signal which is indicative of sensed tape tension, and also to provide a buffer storage capacity for tape 18 in those instances where the adjacent tape reel tends to overrun or underrun the adjacent tape drive capstan.

It will be observed from FIG. 1 that tape drive capstans 23 and 24, each of which is driven by conventional mechanisms which form no part of this invention, are arranged so that the tape path between the capstans is across the face of head assembly 19. Also, idler rollers 22 and 25 are so disposed relative to capstans 23 and 24, respectively, that the tape makes a substantial wrap around the circumference of the capstans. Transport 10 is characterized by the absence of pinch rollers in conjunction with capstans 23 and 24, and suitable engagement of tape 18 with a substantial portion of the circumference of each of capstans 23 and 24 is provided in transport 10 by tension transducers 28 and 29, respectively.

Figure 3:
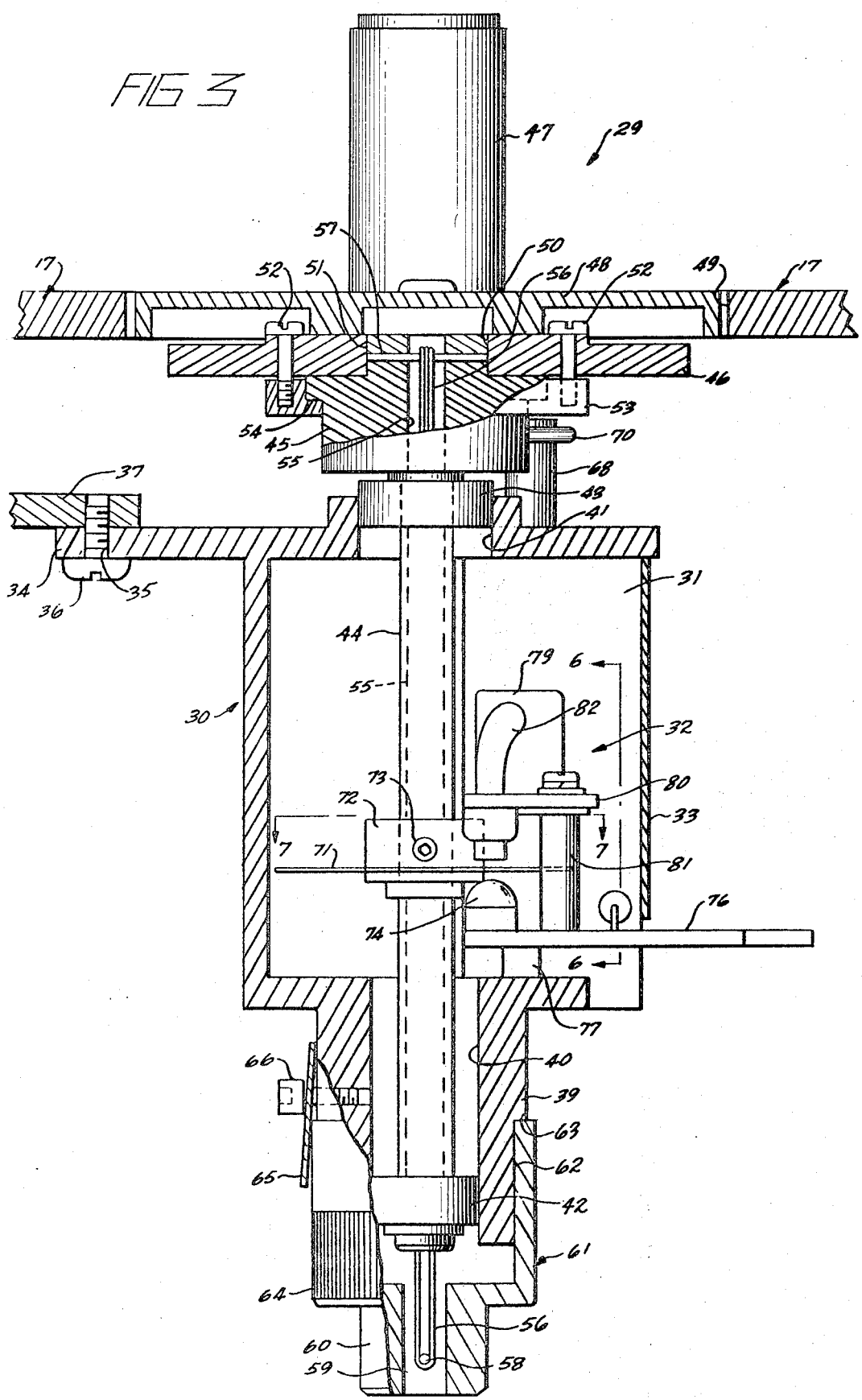
FIG. 3 is an enlarged elevation view, partially in cross-section, of a presently preferred transducer according to this invention.

Referring to FIG. 3, tension transducer 29, which is essentially identical structurally to transducer 28, includes a housing 30 which defines a chamber 31 for a signal generator 32. As defined by the housing, chamber 31 is open at one side, but in practice is substantially closed by a cover 33. An upper portion of housing 30 defines three mounting lugs 34, preferably disposed 120° apart from each other around the circumference of the upper portion of the housing. A hole 35 is formed through each lug so that the housing may be affixed, as by screws 36, to the underside of a tape transport frame plate 37 disposed internally of the transport from face plate 17.

Housing 30, at its lower end, defines a sleeve 39 which extends away from chamber 31. A bore 40 is provided through the sleeve from the chamber in coaxial alignment with a hole 41 through the upper portion of the housing.

A pair of ball bearing assemblies 42 and 43 are disposed in bore 40 and opening 41, respectively, to rotatably mount a hollow shaft 44 which extends through chamber 31 from a hub 45 disposed above bearing 43. Hub 45 provides a support for a carrier plate 46 to which a pair of tape guide rollers 47, only one of which is shown in FIG. 3, are mounted. A cover plate 48, through which the guide rollers extend, is also mounted to carrier plate 46. In use, cover 48 is disposed within an opening 49 formed in the tape transport face plate so that the outer surface of the face plate and the upper surface of cover 48 are coplanar with each other.

Figure 4:
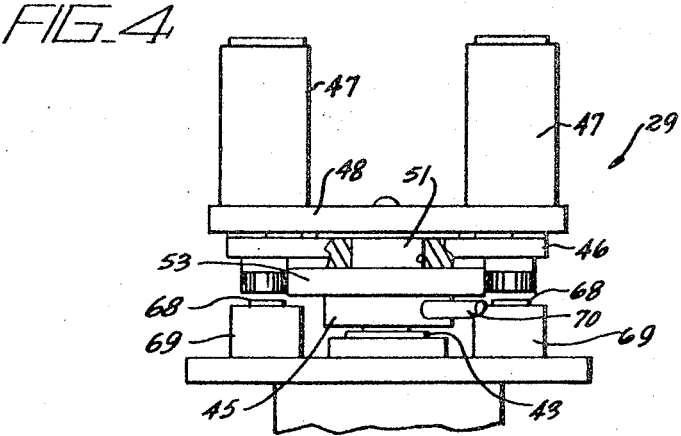
FIG. 4 is a fragmentary elevation view of the upper portion of the transducer shown in FIG. 3.

As shown best in FIGS. 1 and 4, tape guide rollers 47 are mounted to carrier 46 to be rotatable about parallel axes which are disposed parallel to the axis of rotation of hub 45. The axes of guide rollers 47 are spaced equidistantly from and on opposite sides of the rotational axis of hub 45 so that the axes of the hub and of the guide rollers are all disposed in a common plane.

Carrier plate 46 has a central opening 50 within which is received a projection 51 which extends upwardly from hub 45 concentric to the rotational axis of the hub. The carrier plate is held down against the hub by screws 52 which are passed through the carrier plate into threaded engagement with a clamp ring 53 which cooperates with an undercut shoulder 54 provided in the hub.

As shown in FIG. 3, the hollow bore 55 of shaft 44 extends through hub 45 and projection 51 thereof. A torsion spring 56 is disposed within bore 55 and preferably is defined by a plurality of turns of music wire or the like arranged to define an elongate wire loop, as shown. The upper end of spring 56 is engaged with a retainer pin 57 connected to hub 45 preferably within projection 51. The lower end of spring 56 is engaged with a lower retainer pin 58 which is disposed transversely of a bore 59 provided through a coaxial extension 60 of an adjustment knob 61.

Housing sleeve 39 has a reduced external diameter portion 62 at its lower end below a downwardly opening shoulder 63. Adjustment knob 61 has an inner diameter which opens to the upper large end of the knob and which is sized to cooperate with the reduced diameter portion of sleeve 39. The tension in spring 56 induces the upper end of knob 61 into abutment with shoulder 63 in such a manner that adjustment knob 61 may be rotated upon sleeve 39 for adjusting the effective bias force applied by spring 56 to carrier plate 46. The outer portions of knob 61 are knurled as at 64 to facilitate manual indexing of the knob angularly relative to housing 30. A clamp element 65 is associated with an adjustment lock screw 66 threaded into sleeve 39 above the upper end of adjustment knob 61. As shown best in FIG. 3, the outer end of adjustment knob 61 is somewhat greater in diameter than the outer diameter of sleeve 39 above shoulder 63. Tightening of screw 66 toward sleeve 39 causes clamp element 65 to be urged into clamping relationship with the outer portion of the adjustment knob to secure the adjustment knob in a desired position angularly relative to housing 30.

Figure 5:
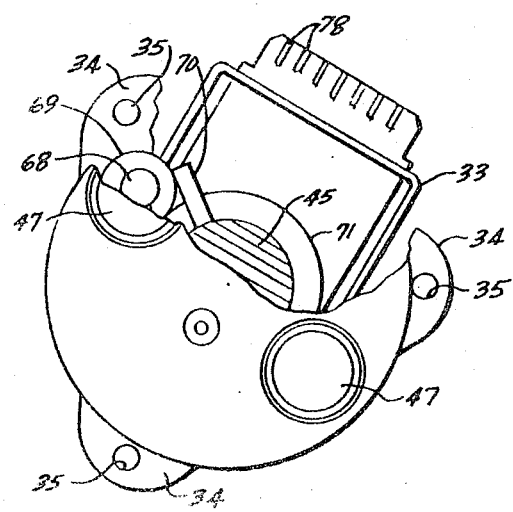
FIG. 5 is a top plan view, with parts broken away, of the transducer of FIG. 3.
Figure 6:
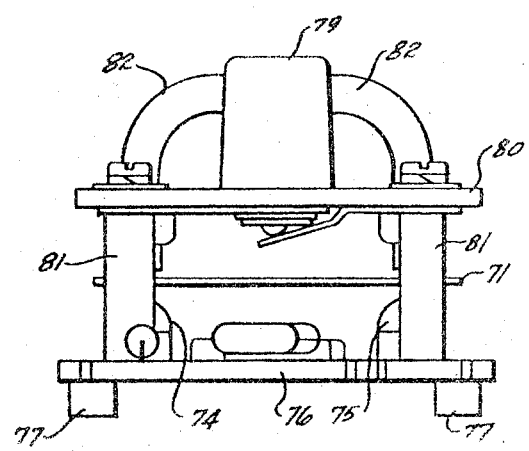
FIG. 6 is a fragmentary elevation view taken along line 6—6 in FIG. 3 of the signal generator of the transducer.

A pair of stop posts 68 (see FIG. 4) extend upwardly from the upper portion of housing 30 below clamp ring 53. Preferably each stop post 68 is equipped with a circumferential rubber tire 69 shown in FIGS. 4 and 5, but not in FIG. 3. The stop posts and their tires define two spaced limits of rotation of carrier plate 46 about its axis of rotation. Preferably the stop posts are arranged so that the carrier may rotate through an arc of about 120°. The stop posts cooperate with hub 45 to define the limits of angular movement of the carrier via a finger 70 which extends radially from the hub below clamp ring 53 sufficiently far that it is capable of engaging the tires provided around the stop posts.

In practice, stop posts 68 provide only one limit to the rotation of carrier plate 46, and that limit is the limit which corresponds to the total absence of tension in tape 18. Two stop posts are provided in the transducer structure so that the same basic mechanism may be used for each of transducers 28 and 29 in transport 10. That is, if the transducer structure is used to define a transducer to occupy the position shown at 28 in FIG. 1, the transducer is a left-hand transducer, whereas if the transducer is to occupy the position shown at 29 in FIG. 1, then the transducer is a right-hand transducer. In a right-hand transducer, carrier 46 rotates clockwise with increasing tape tension, whereas in a left-hand transducer, the rotation of carrier 46 is counterclockwise with increasing tape tension.

Signal generator 32 preferably is of the electro-optical type and includes a light-modulating disc 71 mounted on shaft 44 within chamber 31 for rotation with the shaft. The mounting of the light-modulating disc to the shaft is via a disc hub assembly 72 which is secured to the shaft by a setscrew 73. Disc 71 extends radially away from shaft 44 within chamber 31 to above a pair of photocells 74 and 75, which are spaced from each other angularly of shaft 44. The photocells are mounted on a circuit board 76, which is in turn mounted to housing 30 via a pair of stand-off posts 77. As shown best in FIG. 3, circuit board 76 extends outwardly from chamber 31 through an opening provided for this purpose in the lower portion of cover 33, to adapt the transducer for connection to the circuitry of tape transport 10 by a suitable connector engaged with the unsupported end of the circuit board to cooperate with a plurality of conductors 78 preferably plated to the circuit board by conventional techniques. A light source 79 is disposed above disc 71 and preferably is supported on an insulative member 80 mounted to circuit board 76 by a pair of stand-off posts 81. A pair of light pipes 82 extend in opposite directions from the light source to just above light modulator disc 71 in alignment with photocells 74 and 75, respectively. Light source 79 may be used to generate visible or invisible light radiation, as desired. It will be appreciated, however, that a pair of light sources may be used in a signal generator for the present transducer if desired, rather than the single light source equipped with light pipes, as shown in the drawings.

Figure 7:
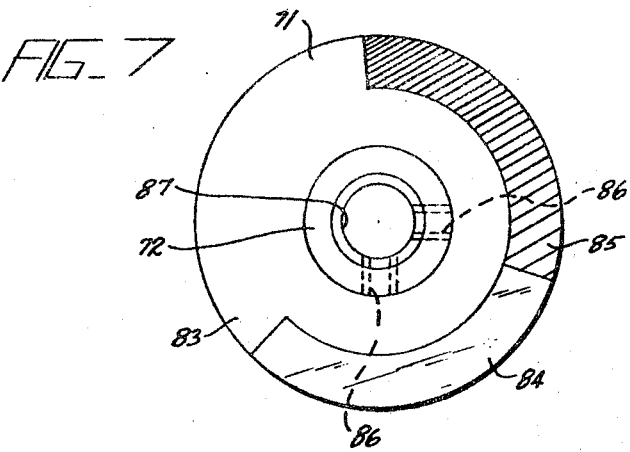
FIG. 7 is a plan view taken along line 7—7 in FIG. 3 of the light modulator disc.

As represented in FIG. 7, which is a plan view of light-modulating disc 71, the periphery of the disc is divided into three discrete areas 83, 84 and 85, which are of substantially equal extent angularly about shaft 44. Disc area 83 is fully opaque and is incapable of transmitting light in any significant degree. Disc area 84 is transparent. Disc area 85 is arranged so that the disc in this portion of its circumference is of varying transmissivity proceeding around the circumference of the disc. Preferably the transmissivity of disc 71 in area 85 varies linearly per degree of arc around the disc. This variable transmissivity of disc portion 85 is represented in FIG. 7 by the changing spacing of the gridlines shown on the disc.

FIG. 7 also illustrates that hub 72 for disc 71 is provided with two tapped holes 86, disposed at right angles to each other, to a hub bore 87 through which shaft 44 is passed. The provision of dual holes 86 for setscrew 73 makes it possible for a single disc design to be used in transducers according to this invention regardless of whether the transducers, in the last analysis, are left-hand or right-hand. That is, for a left-hand transducer, the light modulator disc would be mounted upsidedown relative to the arrangement shown in FIG. 3 for a right-hand transducer.

The light modulator disc for the present transducer is mounted to shaft 44 so that when stop finger 70 is engaged with its stop post, the portion of opaque disc section 83 which lies adjacent to transparent disc portion 84 will be interposed between photocell 74 and the light source. During normal operation of the transducer, however, i.e., when tape transport 10 is operating and the tension in tape 18 is at the desired level, carrier plate 46 will be displaced about halfway through its permitted range of travel so that the transparent portion 84 of disc 71 will be disposed over photosensor 74 and so that the variable transmissivity portion 85 of the disc will be interposed between photosensor 75 and the light source. During normal operation of the transducer, therefore, photosensor 75 is the principal operative photosensor within the transducer, and the amount of light sensed by this sensor will vary essentially linearly with the position of carrier plate 46 about its axis of rotation. In the event that tape 18 should break, however, the carrier plate would be induced by spring 56 to rotate into engagement with its limit and thereby switch sensor 74 from an ON to an OFF position. Such an event generates an OFF signal which is applied, via a suitable control circuit 88 (see FIG. 2), to completely disable the operation of reel drive motor 15, for example. During normal operation of the transport, the signal developed by photosensor 75 is applied to control circuit 88 to regulate the torque developed by the adjacent motor. It is apparent, therefore, that during normal operation of the transducer, the transducer functions to generate a signal indicative of the instantaneous position of guide roller carrier 46. In the event that the carrier should be biased by spring 56 to its effective limit of rotational movement, the transducer functions to generate a unique signal which is applied to the adjacent motor to interrupt the operation of the motor.

Referring again to FIG. 3, which pertains to right-hand tape tension transducer 29, once the transducer has been installed in the transport, the torsional bias of spring 56 is adjusted to the desired level dependent upon the type and width of magnetic tape to be used in the transport. This adjustment is accomplished by a loosening adjustment lock screw 66 and by indexing adjusting knob 61 counterclockwise relative to housing 30 until the desired torsional bias has been imposed upon the spring; the adjusting knob is then secured in this position relative to the housing by tightening lock screw 66. The bias force to which spring 56 is adjusted is selected so that, during normal operation of the transducer, stop finger 70 is positioned approximately midway between stop posts 68. Tape 18 is then threaded through the transducer in the manner shown in FIG. 1 so that tension in tape 18 is effective at transducer 29 upon both of guide rollers 47 to urge carrier 46 to rotate clockwise about its axis in response to increasing tape tension. That is, if tape guide rollers 47 are spaced one inch from the axis of carrier plate 46 and it is desired to maintain 6 ounces tension in tape 18, spring 56 is biased to exert a torque of 12 inch-ounces upon the carrier when stop finger 70 is midway between stop posts 68. The 12 inch-ounce bias torque applied by spring 56 to the carrier plate is shared equally between the portions of tape extending from tape guide 27 to transducer 29, and from transducer 29 to tape guide 26.

During normal operation of transducer 29, for example, the position of carrier plate 46 oscillates only slightly from its optimum position in which stop finger 70 is disposed midway between stop posts 68. It will be apparent, however, that the transducer itself provides some tape storage capacity within tape transport 10. In a presently preferred transducer according to this invention, the transducer provides plus or minus 2 inches tape capacity in that the total amount of tape between reel 12, for example, and head assembly 19 may vary by plus or minus 2 inches from the normal tape quantity before stop finger 70 will engage either of stop posts 68.

The preceding description has been presented principally with reference to FIGS. 3, 4, 5, 6 and 7, which illustrate the structure of a right-hand transducer according to this invention. By convention, a right-hand transducer has been defined as a transducer in which the carrier plate for tape guide rollers 47 is biased by spring 56 to rotate counterclockwise against tension forces applied to the carrier plate by tape engaged by guide rollers 47. It will be apparent from the preceding description, however, that essentially identical structure, adjusted so that the spring urges the carrier clockwise, may be used to define a left-hand transducer according to this invention.

Also, it will be apparent from the preceding description that the present transducer is an essentially self-contained module within tape transport 10. This modular characteristic of the transducer makes it possible to quickly replace the transducer within the transport if necessary. Further, the adjustment knob of the transducer is readily accessible within the interior of the transport for alteration of the bias force applied by spring 56 to carrier plate 46. The adjustability of the bias force applied by the spring to the carrier plate makes it easy to adjust the transport for use with magnetic recording tapes of different type or width.

Those skilled in the art to which this invention pertains will appreciate that during operation of tape transport 10 to move tape 18 past head assembly 19 from reel 11 to reel 12, drive motor 15 for reel 11 is operated to rotate clockwise. Such operation of motor 15 is used to provide a drag against which capstan 23 operates to advance tape 18 to itself through transducer 28. Transducer 28 is coupled only to the drive motor for reel 11. Transducer 29, on the other hand, is coupled only to the drive motor for reel 12, which motor is operated to rotate counterclockwise.

The foregoing description has been presented with reference to the presently preferred structural embodiment of the invention. Workers skilled in the art to which the invention pertains will recognize that modifications and alterations may be made in the described structure without departing from the scope of the invention. Therefore, the preceding description should not be taken to delineate the only form which this invention may take or to precisely limit the scope of the invention.

I claim:

1. In a strip tension transducer which includes sensing means engageable with a moving strip for the application of a force thereto by tension in the strip, the sensing means being mounted for movement toward and away from a limit of motion thereof in response to decreases and increases in strip tension force applied to sensing means and being biased toward said limit against strip tension force applied thereto, and electrical signal generating means coupled to the sensing means for generating a signal indicative of the position of the sensing means relative to said limit, the improvement in the electrical signal generating means comprising a pair of photocells, means for illuminating the photocells, and a light modulating member coupled to the sensing means for movement in response to movement of the sensing means and disposed between the illuminating means and the photocells, light modulating member defining an opaque portion, a transparent portion, and a light transmissive portion in which the light transmissivity varies proceeding along the extent thereof, the modulating member being coupled to the sensing means so that when the sensing means is disposed away from its limit of motion the transmissive portion of the modulating member is interposed between the light source and one photocell and the transparent portion of the modulating member is interposed between the illuminating means and the other photocell, the modulating member further being coupled to the sensing means so that when the sensing means is at its limit of motion the opaque portion of the modulating member is interposed between the illuminating means and the other photocell, whereby the output of the other photocell is usable to control the operation of strip drive means in an on-off manner and whereby the output of the one photocell is usable to regulate the operation of the strip drive means to vary tension in the strip.

* * * * *